(12) United States Patent
Kashima

(10) Patent No.: US 10,571,731 B2
(45) Date of Patent: Feb. 25, 2020

(54) IMAGE QUALITY IMPROVING FILM AND PREPARATION METHOD THEREOF, DISPLAY PANEL AND DISPLAY DEVICE

(71) Applicant: BOE Technology Group Co., Ltd., Beijing (CN)

(72) Inventor: Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 15/576,618

(22) PCT Filed: Apr. 20, 2017

(86) PCT No.: PCT/CN2017/081204
§ 371 (c)(1),
(2) Date: Nov. 22, 2017

(87) PCT Pub. No.: WO2017/181962
PCT Pub. Date: Oct. 26, 2017

(65) Prior Publication Data
US 2018/0164633 A1     Jun. 14, 2018

(30) Foreign Application Priority Data

Apr. 21, 2016 (CN) .......................... 2016 1 0252464

(51) Int. Cl.
*G02F 1/1335* (2006.01)
*G02F 1/137* (2006.01)
(Continued)

(52) U.S. Cl.
CPC ........ *G02F 1/133504* (2013.01); *G02F 1/137* (2013.01); *G02F 1/1334* (2013.01);
(Continued)

(58) Field of Classification Search
None
See application file for complete search history.

(56) References Cited

U.S. PATENT DOCUMENTS 6,600,538 B1* 7/2003 Shiomi ............. G02F 1/133753
349/129
6,738,112 B1* 5/2004 Sekiguchi ......... G02F 1/133504
349/63
(Continued)

FOREIGN PATENT DOCUMENTS

CN   1274861 A   11/2000
CN   1366191 A    8/2002
(Continued)

OTHER PUBLICATIONS

First Office Action, including Search Report, for Chinese Patent Application No. 201610252464.0, dated Jun. 4, 2018, 22 pages.
(Continued)

*Primary Examiner* — Ryan Crockett
(74) *Attorney, Agent, or Firm* — Westman, Champlin & Koehler, P.A.

(57) ABSTRACT

Disclosed is an image quality improving film and a preparation method thereof, a display panel and a display device. The image quality improving film includes a scattering layer for covering a pixel region of a display layer to scatter a light coming from the display layer. By attaching the image quality improving film to image-displaying side of the display layer in the display panel and covering the pixel region of the display layer with the scattering layer, the scattering layer of the image quality improving film can scatter a light coming from the display layer, thereby increasing the viewing angle of the display panel.

14 Claims, 6 Drawing Sheets

(51) Int. Cl.
*G02F 1/1343* (2006.01)
*G02F 1/1333* (2006.01)
*G02F 1/1334* (2006.01)

(52) U.S. Cl.
CPC .... *G02F 1/13439* (2013.01); *G02F 1/133365* (2013.01); *G02F 2001/13756* (2013.01); *G02F 2001/133388* (2013.01); *G02F 2202/023* (2013.01); *G02F 2202/043* (2013.01)

(56) References Cited

U.S. PATENT DOCUMENTS

| | | | |
|---|---|---|---|
| 8,687,145 B2 | 4/2014 | Lee et al. | |
| 2002/0140881 A1* | 10/2002 | Nakanishi | G02B 5/0236 349/86 |
| 2008/0055523 A1* | 3/2008 | Nishihara | G02F 1/133504 349/96 |
| 2012/0038876 A1* | 2/2012 | Lee | C09K 19/2007 349/175 |
| 2016/0246138 A1* | 8/2016 | Tang | G02F 1/133711 |

FOREIGN PATENT DOCUMENTS

| | | |
|---|---|---|
| CN | 101149494 A | 3/2008 |
| CN | 102472841 A | 5/2012 |
| CN | 104460138 A | 3/2015 |
| CN | 104749837 A | 7/2015 |
| CN | 105700263 A | 6/2016 |
| JP | 08-146418 A | 6/1996 |
| JP | 2977454 B2 | 11/1999 |

OTHER PUBLICATIONS

English translation of International Search Report and Box V, of the Written Opinion, for International Application No. PCT/CN2017/081204 (Chinese versions were previously submitted at the time the application was filed), dated Jul. 27, 2017, 9 pages.

\* cited by examiner

IMAGE QUALITY IMPROVING FILM AND PREPARATION METHOD THEREOF, DISPLAY PANEL AND DISPLAY DEVICE

CROSS-REFERENCE TO RELATED APPLICATION

The present disclosure is a Section 371 National Stage Application of International Application No. PCT/CN2017/081204, filed Apr. 20, 2017, and published as WO/2017/181962 on Oct. 26, 2017, and claims a priority benefit of Chinese Patent Application No. 201610252464.0, filed on Apr. 21, 2016, the entire contents thereof are incorporated herein by reference

TECHNICAL FIELD

The present disclosure relates to the field of display technology, and particularly to an image quality improving film and a preparation method thereof, a display panel and a display device.

BACKGROUND ART

Display panels are widely used in various electronic devices such as display, tablet PC, smartphone and the like, due to the advantages of light weight, low thickness, low power consumption, high luminance, high image quality, etc. The display panel includes a liquid crystal layer, in which liquid crystal molecules are anisotropic substance, resulting that a viewer cannot see the image on the display panel when the viewing angle goes beyond a certain value.

SUMMARY

The embodiments of the present disclosure relate to an image quality improving film and a preparation method thereof, a display panel and a display device, including the following technical solutions.

A first aspect of the present disclosure provides an image quality improving film to be attached to image-displaying side of a display layer in a display panel, wherein the image quality improving film comprises a scattering layer for covering a pixel region of the display layer to scatter a light coming from the display layer.

In some embodiments, the image quality improving film further comprises a first substrate and a second substrate, wherein the scattering layer is disposed between the first substrate and the second substrate.

Further, in some embodiments, the image quality improving film further comprises a liquid crystal polymer wall, a first transparent conductive layer and a second transparent conductive layer, wherein the liquid crystal polymer wall is positioned between the first substrate and the second substrate and outside the scattering layer, wherein an inner lateral face of the liquid crystal polymer wall is attached to an outer lateral face of the scattering layer, and the liquid crystal polymer wall is switchable between a transparent state and an opaque state;

the first transparent conductive layer is positioned between the liquid crystal polymer wall and the first substrate, and the second transparent conductive layer is positioned between the liquid crystal polymer wall and the second substrate.

In some embodiments, the material of the liquid crystal polymer wall is a polymer of a dichroic dye, a liquid crystal, a polymerizable monomer and a photo-initiator.

In some embodiments, the liquid crystal is a nematic liquid crystal.

In some embodiments, the polymerizable monomer is an acrylic monomer.

In some embodiments, the liquid crystal polymer wall is positioned around the scattering layer, or the liquid crystal polymer wall is positioned outside two opposite lateral sides of the scattering layer.

In some embodiments, the material of the scattering layer is a polymer of a liquid crystal, a polymerizable monomer and a photo-initiator.

A second aspect of the present disclosure provides a preparation method of an image quality improving film to be attached to image-displaying side of a display layer in a display panel, wherein the preparation method of an image quality improving film comprises the following step:

forming a scattering layer for covering a pixel region of a display layer to scatter a light coming from the display layer.

In some embodiments, said forming a scattering layer comprises:

forming a scattering layer on a first substrate; and
fixing a second substrate onto the scattering layer.

In some embodiments, said forming a scattering layer on a first substrate comprises:

mixing a liquid crystal, a polymerizable monomer and a photo-initiator for preparing the scattering layer in the following mass percentages:

the liquid crystal: 70%-80% by mass; the polymerizable monomer: 19%-29.5% by mass; and the photo-initiator: 0.3%4% by mass of the polymerizable monomer;

applying the mixed materials for preparing the scattering layer onto the first substrate, and polymerizing and curing the materials to form the scattering layer.

In some embodiments, said polymerizing and curing the materials to form the scattering layer is performed by irradiating with UV light.

In some embodiments, before fixing the second substrate onto the scattering layer, the preparation method of an image quality improving film further comprises:

forming a first transparent conductive layer on the first substrate, the first transparent conductive layer being positioned outside the scattering layer, and an inner lateral face of the first transparent conductive layer being attached to an outer lateral face of the scattering layer;

forming a second transparent conductive layer on the second substrate, the second transparent conductive layer having the same pattern as that of the first transparent conductive layer, and an orthographic projection on the first substrate of the second transparent conductive layer coinciding with that of the first transparent conductive layer; and forming a liquid crystal polymer wall on the second transparent conductive layer, the liquid crystal polymer wall covering the second transparent conductive layer.

In some embodiments, said forming a liquid crystal polymer wall on the second transparent conductive layer comprises:

mixing a dichroic dye, a liquid crystal, a polymerizable monomer and a photo-initiator for preparing the liquid crystal polymer wall in the following mass percentages:

the dichroic dye: 0.5%4% by mass; the liquid crystal: 70%-80% by mass; the polymerizable monomer: 19%-29.5% by mass; and the photo-initiator: 0.3%-1% by mass of the polymerizable monomer;

applying the mixed materials for preparing the liquid crystal polymer wall onto the second transparent conductive layer, and polymerizing and curing the materials to form the liquid crystal polymer wall.

In some embodiments, said polymerizing and curing the materials to form the liquid crystal polymer wall is performed by irradiating with UV light.

In some embodiments, the first transparent conductive layer being positioned outside the scattering layer comprises:

the first transparent conductive layer being positioned around the scattering layer, or the first transparent conductive layer being positioned outside two opposite lateral sides of the scattering layer.

A third aspect of the present disclosure provide a display panel comprising the image quality improving film described above, wherein the image quality improving film is attached to image-displaying side of a display layer in the display panel, and the scattering layer of the image quality improving film covers a pixel region of the display layer.

In some embodiments, the image quality improving film further comprises a liquid crystal polymer wall positioned between a first substrate and a second substrate and outside the scattering layer, wherein an outer lateral face of the liquid crystal polymer wall is attached to an inner lateral face of a frame of the display panel, and the liquid crystal polymer wall is switchable between a transparent state and an opaque state.

A fourth aspect of the present disclosure provides a display device comprising the display panel described above.

BRIEF DESCRIPTION OF DRAWINGS

To more clearly illustrate the technical solutions in the embodiments of the present disclosure, the drawings to be used in the description of the embodiments will be briefly introduced below. Obviously, the drawings in the following description are only some embodiments of the present disclosure, and other drawings can be obtained by those skilled in the art according to these drawings without inventive efforts.

DETAILED DESCRIPTION

In order to make the objects, technical solutions and advantages of the present application more clear, some particular embodiments will be further described in details below in combination with the drawings.

Figure 1:
FIG. 1 shows a structural schematic diagram of an image quality improving film provided in an embodiment of the present disclosure.
Figure 2:
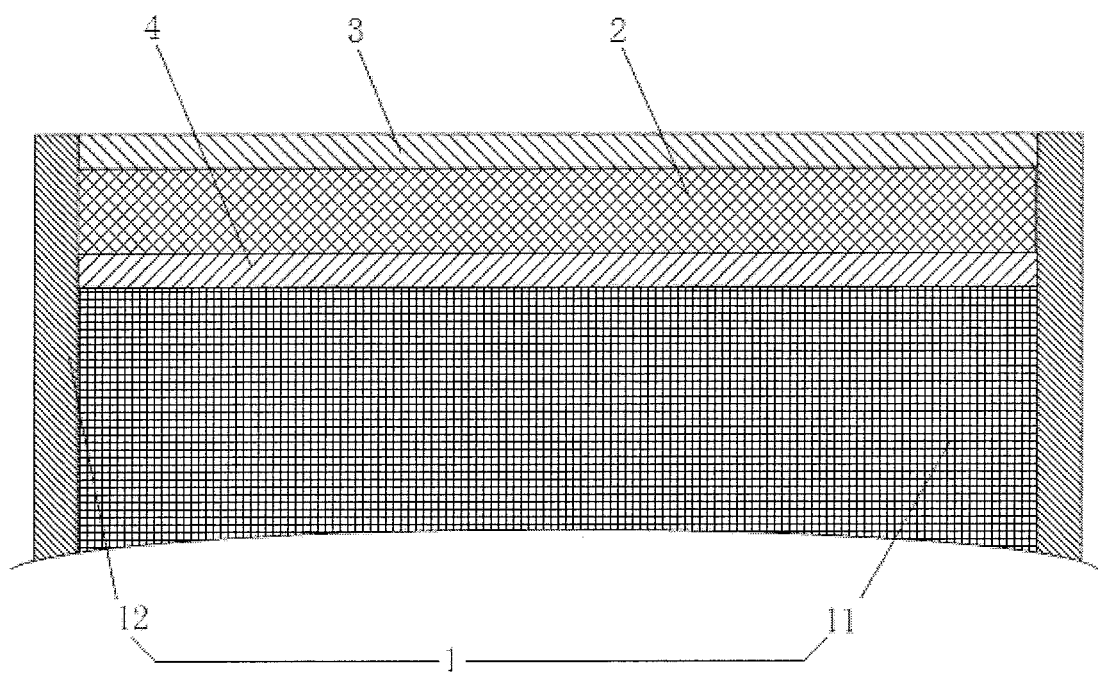
FIG. 2 shows a schematic diagram of an image quality improving film in use state provided in another embodiment of the present disclosure.

As shown in FIG. 1, an embodiment of the present disclosure provides an image quality improving film, which comprises a scattering layer 2. As shown in FIG. 2, the image quality improving film of the present disclosure is used for being attached to image-displaying side of a display layer 1 in a display panel, and the scattering layer 2 thereof is used for covering a pixel region 11 of the display layer 1 to scatter a light coming from the display layer 1.

In embodiments of the present disclosure, illustrated is an example where an image quality improving film provided in the present disclosure is used for being attached to image-displaying side of a display layer 1 in a liquid crystal display panel, wherein the display layer 1 mainly comprises an array substrate, a liquid crystal layer, and a color film substrate, wherein the liquid crystal layer is a pixel region 11 of the display layer 1 and is positioned between the array substrate and the color film substrate, and the array substrate and the color film substrate are fixed within a frame 12 of the display panel respectively; the image quality improving film provided in an embodiment of the present disclosure is attached to the side of the color film substrate away from the liquid crystal layer, and the scattering layer 2 covers the liquid crystal layer of the display layer 1.

Figure 3:
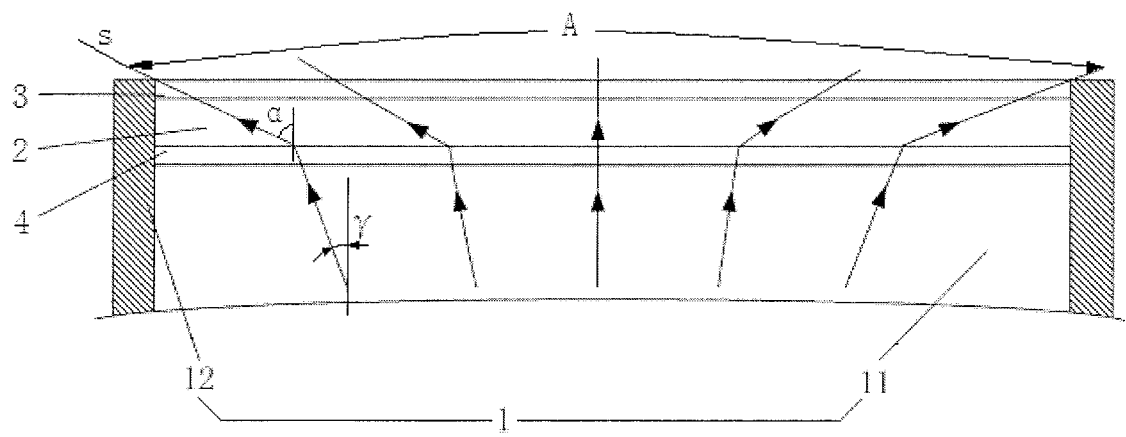
FIG. 3 shows a schematic diagram of an optical path by which a light from a display layer passes through an image quality improving film provided in another embodiment of the present disclosure.

When the display panel displays an image, a light emitted by a backlight source of the display device passes through the display layer 1 and is transmitted through the scattering layer 2, as shown in FIG. 3. In the embodiment of the present disclosure, a light S is taken as an example to illustrate the scattering effect of the scattering layer 2 on the light. When no scattering layer 2 is disposed, the viewing angle of the light S coming from the display layer 1 is y. When the light S from the display layer 1 is transmitted through the scattering layer 2, the propagation direction of the light S is changed by the scattering layer 2 such that the viewing angle of the light S is increased to α, as a result, the viewing angle of the display panel is increased by disposing the scattering layer 2. At this moment, the viewing angle of the display panel is more than 45 degree, and any viewer in the viewing area A can see the image displayed on the display panel.

In the embodiment of the present disclosure, by attaching the image quality improving film to image-displaying side of the display layer 1 in the display panel and covering the pixel region 11 of the display layer 1 with the scattering layer 2 of the image quality improving film, the scattering layer 2 can scatter a light coming from the display layer 1, so as to increase the viewing angle of the display panel, meeting the user's requirements.

Figure 4:
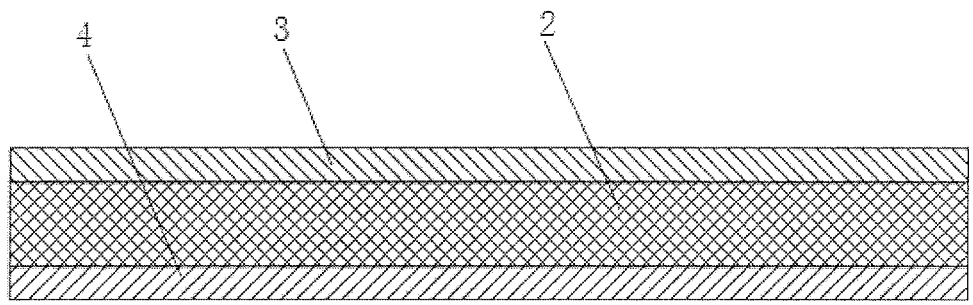
FIG. 4 shows a structural schematic diagram of an image quality improving film provided in another embodiment of the present disclosure.

As shown in FIG. 2 and FIG. 4, in one embodiment of the present disclosure, the image quality improving film further comprises a first substrate 3 and a second substrate 4, wherein the scattering layer 2 is disposed between the first substrate 3 and the second substrate 4.

Because the image quality improving film provided in an embodiment of the present disclosure is attached to image-displaying side of the display layer 1 in the display panel during the use of the image quality improving film, the image quality improving film is directly contacted with air. By disposing a first substrate 3 and a second substrate 4 outside the scattering layer 2, the adhesion of dusts, water vapor or the like in the air on the surface of the scattering layer 2, which would influence the scattering effect of the scattering layer 2, can be prevented.

In an embodiment of the present disclosure, the material of the scattering layer 2 is a polymer of a liquid crystal, a polymerizable monomer and a photo-initiator, and preferably, the liquid crystal is a nematic liquid crystal with a mass percentage of 70%-80%, the polymerizable monomer is an acrylic monomer with a mass percentage of 19%-29.5%, and the mass percentage of the photo-initiator which is used for initiating the polymerization of the acrylic monomer under UV irradiation is 0.3%-4% by mass of the acrylic monomer. Of course, those skilled in the art can understand that the types of the liquid crystal and the polymerizable monomer can be particularly determined depending on the mode of the display panel; the mass percentages of various materials in the scattering layer 2 can be determined depending on the target viewing angle, for example, if the target viewing angle is large, the mass percentage of the liquid crystal is large, or otherwise, the mass percentage of the liquid crystal is small; and the types of the liquid crystal and the polymerizable monomer are not limited to the materials mentioned in the present disclosure.

Figure 5:
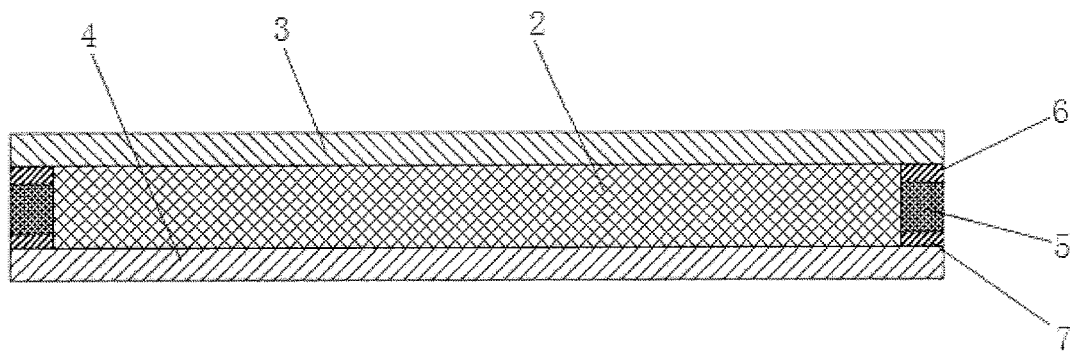
FIG. 5 shows a structural schematic diagram of an image quality improving film provided in another embodiment of the present disclosure.
Figure 6:
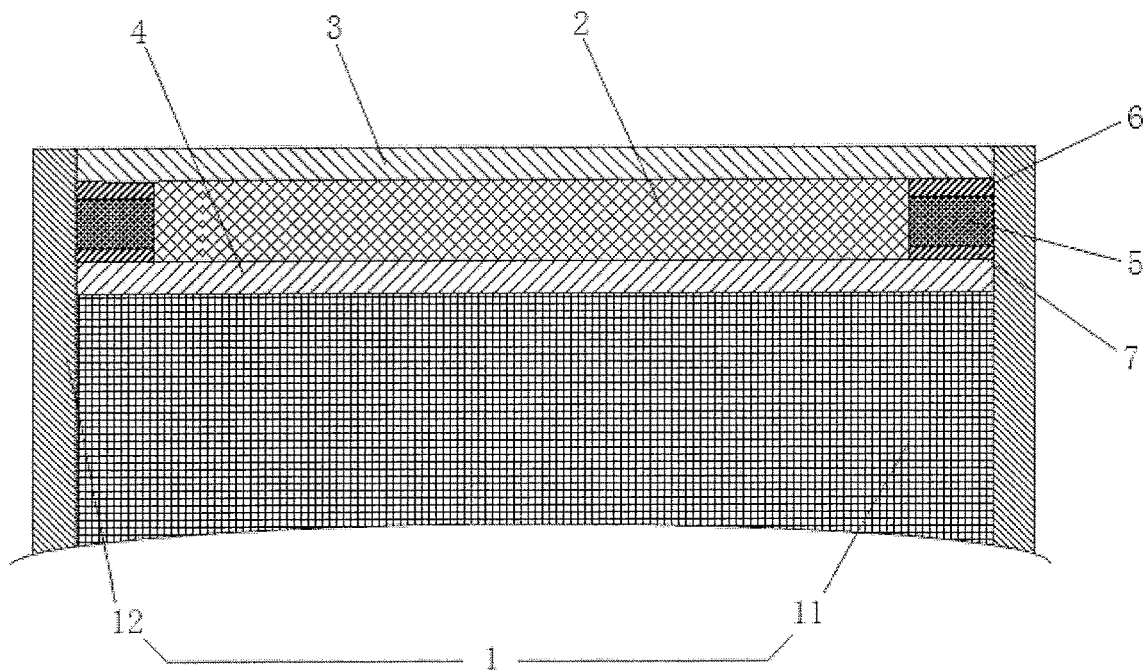
FIG. 6 shows a schematic diagram of an image quality improving film in use sate provided in another embodiment of the present disclosure.

FIG. 5 shows another embodiment of the present disclosure, wherein the image quality improving film further comprises a liquid crystal polymer wall 5, a first transparent conductive layer 6, and a second transparent conductive layer 7, wherein the liquid crystal polymer wall 5 is positioned between the first substrate 3 and the second substrate 4 and is outside the scattering layer 2, an inner lateral face of the liquid crystal polymer wall 5 is attached to an outer lateral face of the scattering layer 2, and the liquid crystal polymer wall 5 and the scattering layer 2 cover the pixel region 11 of the display layer 1 from outside to inside. And as shown in FIG. 6, when the image quality improving film is attached to the image-displaying side of the display layer 1, an outer lateral face of the liquid crystal polymer wall 5 is attached to an inner lateral face of the frame 12 of the display panel.

As shown in FIG. 5, in the embodiment of the present disclosure, the first transparent conductive layer 6 is positioned between the liquid crystal polymer wall 5 and the first substrate 3, and the second transparent conductive layer 7 is positioned between the liquid crystal polymer wall 5 and the second substrate 4.

The first transparent conductive layer 6 and the second transparent conductive layer 7 are used in such a manner that when the display panel displays an image, they allow the liquid crystal polymer wall 5 in a transparent state to scatter the light coming from the display layer 1; and when the display panel displays a dark state, they allow the liquid crystal polymer wall 5 in a black opaque state to absorb the light coming from the display layer 1.

Figure 7:
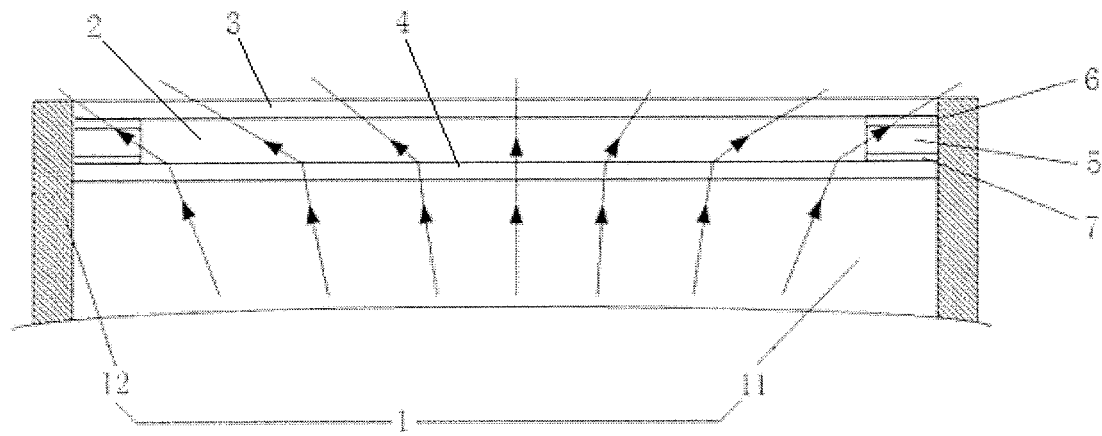
FIG. 7 shows a schematic diagram of an optical path by which a light from a display layer passes through an image quality improving film provided in another embodiment of the present disclosure, when the display panel displays an image.
Figure 8:
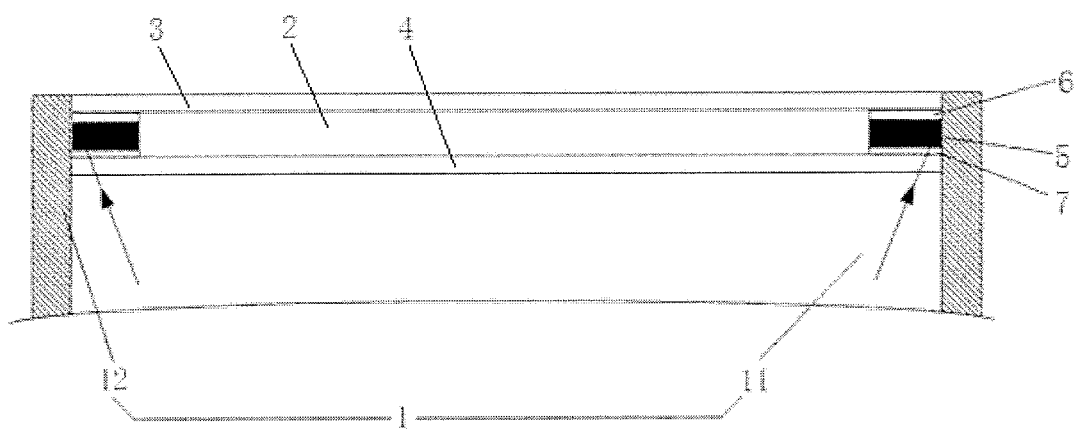
FIG. 8 shows a schematic diagram of an optical path by which a light from a display layer passes through an image quality improving film provided in another embodiment of the present disclosure, when a display panel displays a dark state.

In the embodiment of the present disclosure, by disposing a liquid crystal polymer wall 5 outside the scattering layer 2 and attaching an inner lateral face of the liquid crystal polymer wall 5 to an outer lateral face of the scattering layer 2, it is ensured that the liquid crystal polymer wall 5 and the scattering layer 2 cover the pixel region of the display layer 1 from outside to inside, and when the image quality improving film provided in an embodiment of the present disclosure is attached to the image-displaying side of the display layer 1 in the display panel, an outer lateral face of the liquid crystal polymer wall 5 is attached to an inner lateral face of the frame 12 of the display panel. When the display panel displays an image, the first transparent conductive layer 6 and the second transparent conductive layer 7 apply a voltage to the liquid crystal polymer wall 5, such that the liquid crystal polymer wall 5 presents a transparent state, and the liquid crystal polymer wall 5 as well as the scattering layer 2 scatter the light coming from the display layer 1 (the optical path by which the light coming from the display layer passes through the image quality improving film is as shown in FIG. 7); and when the display panel displays a dark state, for example, the display panel displays a black picture or is powered off, the first transparent conductive layer 6 and the second transparent conductive layer 7 do not apply a voltage to the liquid crystal polymer wall 5, such that the liquid crystal polymer wall 5 presents a black opaque state, at this time, the optical path by which the light coming from the display layer 1 passes through the image quality improving film is as shown in FIG. 8, and the liquid crystal polymer wall 5 absorbs the light coming from the display layer 1 at the sidelines and corners of the display layer 1, so as to prevent the display panel from leaking light under dark state.

Figure 9:
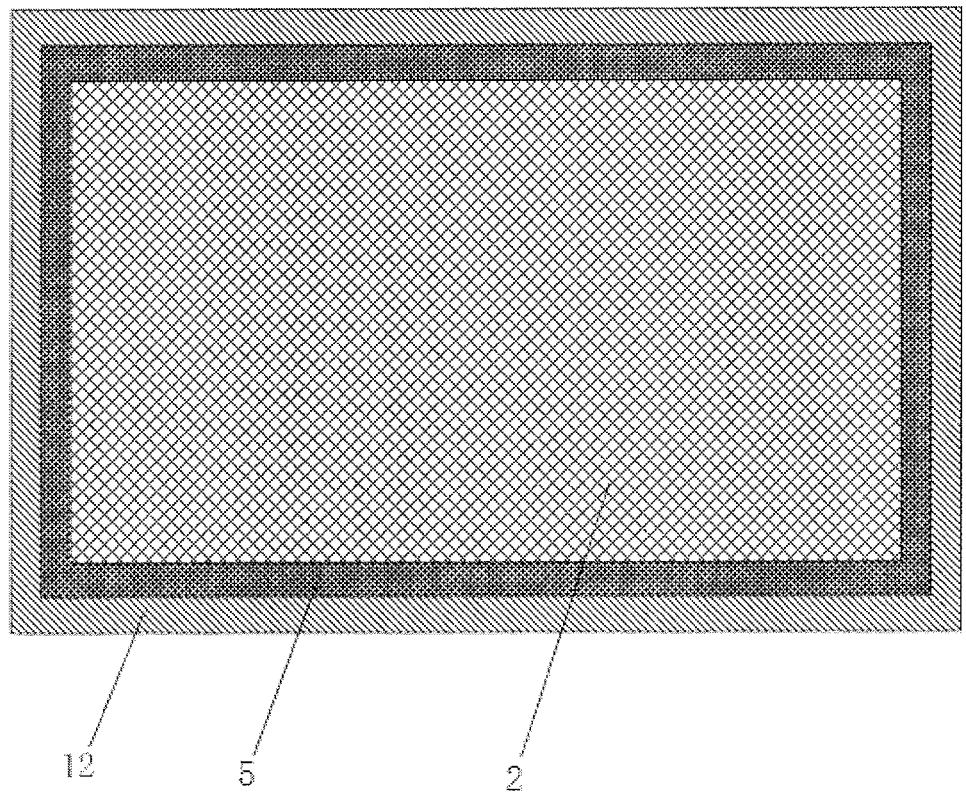
FIG. 9 is a structural schematic diagram showing frame of a display panel, the liquid crystal polymer wall and the scattering layer provided in another embodiment of the present disclosure.

As shown in FIG. 9, in one embodiment of the present disclosure, the liquid crystal polymer wall 5 is positioned around the scattering layer 2, and the liquid crystal polymer wall 5 absorbs the light coming from the display layer 1 when the display panel displays a dark state, to prevent a light from leaking out from the sidelines and corners of the display panel, thereby preventing the display panel from leaking light under dark state.

Of course, those skilled in the art can appreciate that the liquid crystal polymer wall 5 may also be positioned outside two opposite lateral sides of the scattering layer 2, and the liquid crystal polymer wall 5 is attached to four inner angles of the frame 12 of the display panel. In such a way, the liquid crystal polymer wall 5 absorbs the light coming from the display layer 1 when the display panel displays a dark state, to prevent the light from leaking out from the four corners of the display panel and to mitigate the influence of light leakage under dark state on the display effect. This structure is simple and easy to be processed. Here, when the liquid crystal polymer wall 5 is positioned outside two opposite lateral sides of the scattering layer 2, it is preferable that the liquid crystal polymer wall 5 is positioned outside the left and right sides of the scattering layer 2.

In the embodiment of the present disclosure, the material of the liquid crystal polymer wall 5 is a polymer of a dichroic dye, a liquid crystal, a polymerizable monomer and a photo-initiator. Preferably, the liquid crystal is a nematic liquid crystal, the polymerizable monomer is an acrylic monomer, and the mass percentages of various materials for preparing the liquid crystal polymer wall 5 are as follows: the mass percentage of the dichroic dye is 0.5%-1%, the mass percentage of the liquid crystal is 70%-80%, the mass percentage of the polymerizable monomer is 19%-29.5%, and the mass percentage of the photo-initiator is 0.3%-1% by mass of the polymerizable monomer.

Figure 10:
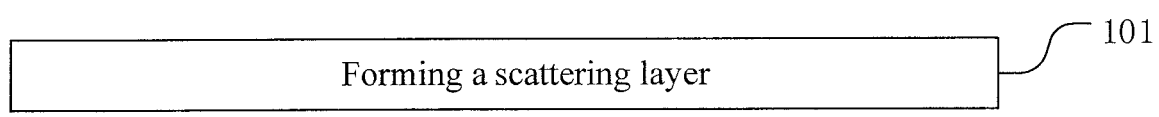
FIG. 10 shows a flow chart of a preparation method of an image quality improving film provided in an embodiment of the present disclosure.

The present disclosure also provides a preparing method of an image quality improving film. As shown in FIG. 10, an embodiment of the present disclosure provides a preparation method of an image quality improving film to be attached to image-displaying side of a display layer in a display panel, the preparation method comprising the following step:

Step 101: forming a scattering layer, which is used for covering a pixel region of a display layer to scatter a light coming from the display layer.

In one embodiment of the present disclosure, the outer contour size of the scattering layer is larger than or equal to the contour size of the pixel region of the display layer of the display panel, and the light coming from the display layer is scattered after incidence into the scattering layer, thus increasing the viewing angle of the display panel.

In the embodiment of the present disclosure, by attaching the image quality improving film to image-displaying side of the display layer in the display panel and covering the pixel region of the display layer with the scattering layer of the image quality improving film, the scattering layer can scatter a light coming from the display layer, thus increasing the viewing angle of the display panel, to meet the user's requirements.

Figure 11:
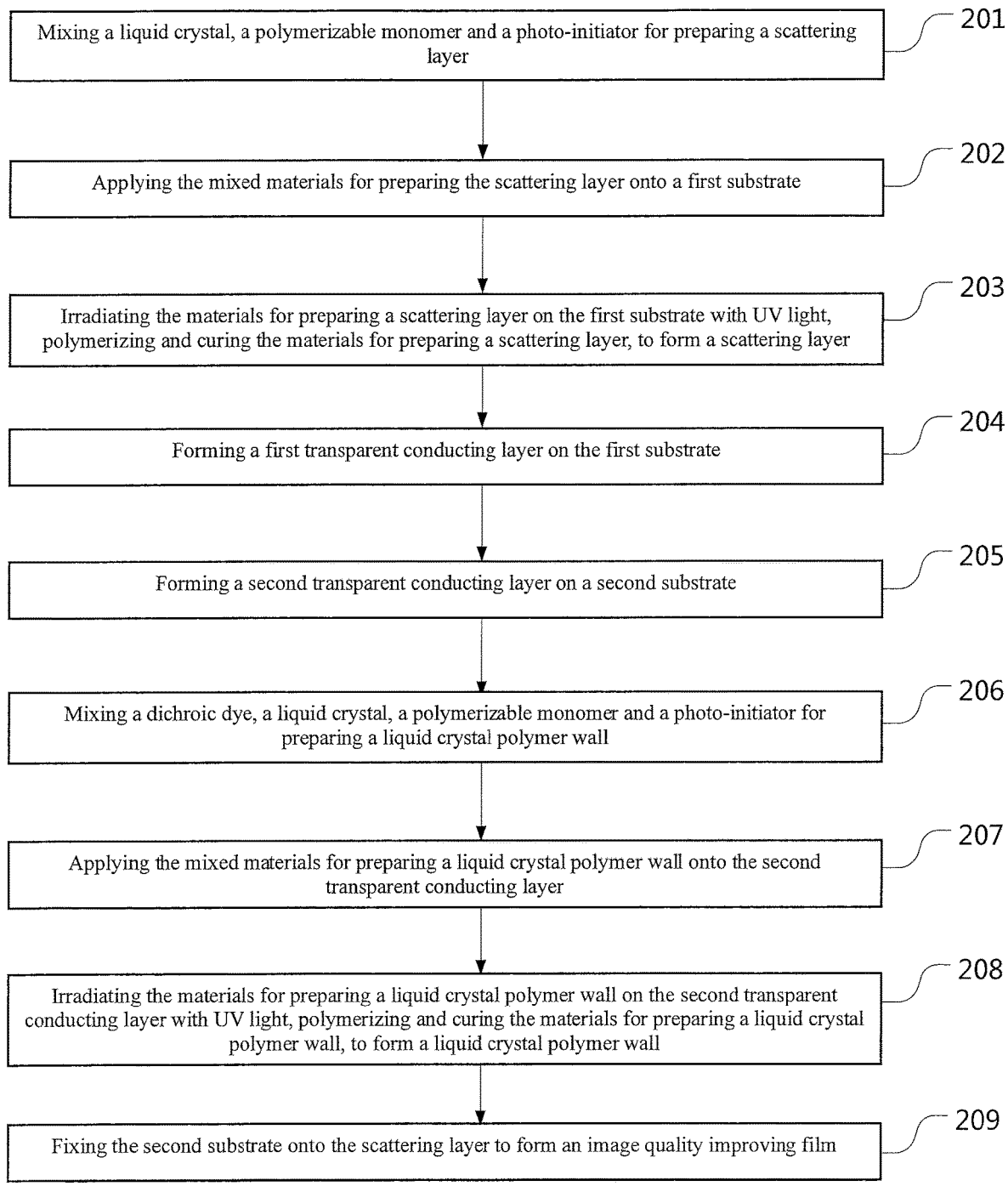
FIG. 11 shows a flow chart of a preparation method of an image quality improving film provided in another embodiment of the present disclosure.

FIG. 11 shows a preparation method of an image quality improving film according to another embodiment of the present disclosure, the method comprising the following steps:

Step 201: mixing a liquid crystal, a polymerizable monomer and a photo-initiator for preparing a scattering layer in the following mass percentages:

the mass percentage of the liquid crystal is 70%-80%, the mass percentage of the polymerizable monomer is 19%-29.5%, and the mass percentage of the photo-initiator is 0.3%-1% by mass of the polymerizable monomer.

In the embodiment of the present disclosure, preferably, the liquid crystal is a nematic liquid crystal, and the polymerizable monomer is an acrylic monomer. Those skilled in the art can understand that the types of the liquid crystal and the polymerizable monomer can be particularly determined depending on the mode of the display panel; the mass percentages of various materials in the scattering layer can be determined depending on the target viewing angle, for example, if the target viewing angle is large, then the mass percentage of the liquid crystal is large, or otherwise, if the target viewing angle is small, then the mass percentage of the liquid crystal is small; and the types of the liquid crystal and the polymerizable monomer are not limited to the materials mentioned in the present disclosure.

Step 202: applying the mixed materials for preparing a scattering layer onto a first substrate, to form a scattering layer on the first substrate.

Here, the area where the materials for preparing a scattering layer is applied on the first substrate should be able to cover the pixel region of the display layer, ensuring that when the image quality improving film is applied on the display panel, the scattering layer covers the pixel region of the display layer to scatter the light coming from the display layer.

Step 203: irradiating the materials for preparing a scattering layer on the first substrate with UV light, polymerizing and curing the materials for preparing a scattering layer, to form a scattering layer.

In the embodiment of the present disclosure, the polymerizable monomer is a photo-polymerizable monomer and is polymerized under the action of a photo-initiator and UV light, as such, the materials for preparing a scattering layer on the first substrate are polymerized and cured, and the process is simple.

Step 204: forming a first transparent conductive layer on the first substrate, such that the first transparent conductive layer is positioned outside the scattering layer, and an inner lateral face of the first transparent conductive layer is attached to an outer lateral face of the scattering layer; when the image quality improving film prepared by a preparation method of the present disclosure is attached to image-displaying side of the display layer, an outer lateral face of the first transparent conductive layer is attached to an inner lateral face of the frame of the display panel.

In one embodiment of the present disclosure, the first transparent conductive layer is formed by depositing the materials for preparing the first transparent conductive layer on the first substrate and patterning the materials through etching, wherein the first transparent conductive layer is positioned outside the scattering layer, and an inner lateral face of the first transparent conductive layer is attached to an outer lateral face of the scattering layer, and when the image quality improving film prepared by a preparation method of the present disclosure is attached to image-displaying side of the display panel, an outer lateral face of the first transparent conductive layer is attached to an inner lateral face of the frame of the display panel.

Step 205: forming a second transparent conductive layer on a second substrate, the second transparent conductive layer having the same pattern as that of the first transparent conductive layer, and an orthographic projection on the first substrate of the second transparent conductive layer coinciding with that of the first transparent conductive layer.

In one embodiment of the present disclosure, the second transparent conductive layer is formed by depositing the materials for preparing the second transparent conductive layer on the second substrate and patterning the materials through etching; the second transparent conductive layer has the same pattern as that of the first transparent conductive layer, which can be fabricated with the same imprint template, and an orthographic projection on the first substrate of the second transparent conductive layer coincides with that of the first transparent conductive layer. After the second substrate is fixed on the scattering layer, an inner lateral face of the second transparent conductive layer is attached to an outer lateral face of the scattering layer; and when the image quality improving film prepared by a preparation method of the present disclosure is attached to the image-displaying side of the display panel, an outer lateral face of the second transparent conductive layer is attached to an inner lateral face of the frame of the display panel.

Step 206: mixing a dichroic dye, a liquid crystal, a polymerizable monomer and a photo-initiator for preparing a liquid crystal polymer wall in the following mass percentages:

the mass percentage of the dichroic dye is 0.5%-1%, the mass percentage of the liquid crystal is 70%-80%, the mass percentage of the polymerizable monomer is 19%-29.5%, and the mass percentage of the photo-initiator is 0.3%-1% by mass of the polymerizable monomer.

Because the dichroic dye exhibits dichroism, the liquid crystal polymer wall can present a transparent state when a voltage is applied, and present a black opaque state when no voltage is applied, such that the state of the liquid crystal polymer wall may be adjusted by controlling whether to apply a voltage to the liquid crystal polymer wall or not.

Step 207: applying the mixed materials for preparing a liquid crystal polymer wall onto the second transparent conductive layer, the liquid crystal polymer wall covering the second transparent conductive layer.

In the embodiment of the present disclosure, when the display panel displays an image, there is a voltage between the first transparent conductive layer and the second transparent conductive layer, and when the display panel displays a dark state, there is no voltage between the first transparent conductive layer and the second transparent conductive layer. In the embodiment of the present disclosure, by disposing the liquid crystal polymer wall outside the scattering layer, and allowing an outer lateral face of the liquid crystal polymer wall to be attached to an inner lateral face of the frame of the display panel when the image quality improving film provided in an embodiment of the present disclosure is attached to image-displaying side of the display layer in the display panel, in the case where the display panel displays an image, the first transparent conductive layer and the second transparent conductive layer apply a voltage to the liquid crystal polymer wall, such that the liquid crystal polymer wall presents a transparent state and scatters the light coming from the display layer together with the scattering layer; and in the case where the display panel displays a dark state, the first transparent conductive layer and the second transparent conductive layer do not apply a voltage to the liquid crystal polymer wall, such that the liquid crystal polymer wall presents a black opaque state and absorbs the light coming from the display layer at the sidelines and corners of the display layer, so as to prevent the display panel from leaking light under dark state.

In an embodiment of the present disclosure, preferably, the first transparent conductive layer being positioned outside the scattering layer comprises:

the first transparent conductive layer being positioned around the scattering layer, or the first transparent conductive layer being positioned outside two opposite lateral sides of the scattering layer.

In the embodiment of the present disclosure, the liquid crystal polymer wall is positioned around the scattering layer or outside two opposite lateral sides of the scattering layer, and the liquid crystal polymer wall absorbs the light coming from the display layer when the display panel displays a dark state, so as to prevent the display panel from leaking light under dark state.

Step 208: irradiating the materials for preparing a liquid crystal polymer wall on the second transparent conductive layer with UV light, polymerizing and curing the materials for preparing a liquid crystal polymer wall, to form a liquid crystal polymer wall.

In the embodiment of the present disclosure, the polymerizable monomer is a photo-polymerizable monomer, the materials for preparing the liquid crystal polymer wall on the second transparent conductive layer are polymerized and cured under the action of a photo-initiator and UV light, and the process is simple.

Step 209: fixing the second substrate onto the scattering layer to form an image quality improving film.

In the embodiment of the present disclosure, after fixing the second substrate onto the scattering layer, the liquid crystal polymer wall is positioned outside the scattering layer, and an inner lateral face of the liquid crystal polymer wall is attached to an outer lateral face of the scattering layer. Here, the second substrate can be fixed onto the scattering layer by using an adhesive.

The present disclosure also provides a display panel which comprises the above described image quality improving film according to the present disclosure or the image quality improving film prepared by the above described preparation method of an image quality improving film.

In the present disclosure, by attaching the image quality improving film to image-displaying side of the display layer in the display panel and covering the pixel region of the display layer with the scattering layer of the image quality improving film, the scattering layer can scatter a light coming from the display layer, thus increasing the viewing angle of the display panel, to meet the user's requirements.

In one embodiment of the present disclosure, by disposing a liquid crystal polymer wall outside the scattering layer, and attaching an outer lateral face of the liquid crystal polymer wall to an inner lateral face of the frame of the display panel when the image quality improving film provided in an embodiment of the present disclosure is attached to image-displaying side of the display layer in the display panel, in the case where the display panel displays an image, the first transparent conductive layer and the second transparent conductive layer apply a voltage to the liquid crystal polymer wall, such that the liquid crystal polymer wall presents a transparent state and scatters the light coming from the display layer together with the scattering layer; and in the case where the display panel displays a dark state, the first transparent conductive layer and the second transparent conductive layer do not apply a voltage to the liquid crystal polymer wall, such that the liquid crystal polymer wall presents a black opaque state and absorbs the light coming from the display layer at the sidelines and corners of the display layer, so as to prevent the display panel from leaking light under dark state.

The present disclosure also provides a display device comprising the display panel described above.

In the present disclosure, by attaching the image quality improving film to image-displaying side of the display layer in the display panel and covering the pixel region of the display layer with the scattering layer of the image quality improving film, the scattering layer can scatter a light coming from the display layer, thus increasing the viewing angle of the display panel, to meet the user's requirements.

In one embodiment of the present disclosure, by disposing a liquid crystal polymer wall outside the scattering layer, and attaching an outer lateral face of the liquid crystal polymer wall to an inner lateral face of the frame of the display panel when the image quality improving film provided in an embodiment of the present disclosure is attached to image-displaying side of the display layer in the display panel, in the case where the display panel displays an image, the first transparent conductive layer and the second transparent conductive layer apply a voltage to the liquid crystal polymer wall, such that the liquid crystal polymer wall presents a transparent state and scatters the light coming from the display layer together with the scattering layer; and in the case where the display panel displays a dark state, the first transparent conductive layer and the second transparent conductive layer do not apply a voltage to the liquid crystal polymer wall, such that the liquid crystal polymer wall presents a black opaque state and absorbs the light coming from the display layer at the sidelines and corners of the display layer, so as to prevent the display panel from leaking light under dark state.

The above descriptions are only some preferred embodiments of the present disclosure, but not intended to limit the present application. Any variations, equivalents, modifications and the like made within the spirit and principle of the present application should be included within the protection scope of the present application.

What is claimed is:

1. An image quality improving film to be attached to image-displaying side of a display layer in a display panel, wherein, the image quality improving film comprises:
   a first substrate;
   a second substrate; and
   a scattering layer, disposed between the first substrate and the second substrate, for covering a pixel region of a display layer to scatter a light coming from the display layer,
   wherein, the image quality improving film further comprises a liquid crystal polymer wall, a first transparent conductive layer and a second transparent conductive layer, wherein the liquid crystal polymer wall is positioned between the first substrate and the second substrate and outside the scattering layer, wherein an inner lateral face of the liquid crystal polymer wall is attached to an outer lateral face of the scattering layer, and the liquid crystal polymer wall is switchable between a transparent state and an opaque state;
   the first transparent conductive layer is positioned between the liquid crystal polymer wall and the first substrate, and the second transparent conductive layer is positioned between the liquid crystal polymer wall and the second substrate.

2. The image quality improving film according to claim 1, wherein, the material of the liquid crystal polymer wall is a polymer of a dichroic dye, a liquid crystal, a polymerizable monomer and a photo-initiator.

3. The image quality improving film according to claim 2, wherein, the liquid crystal is a nematic liquid crystal.

4. The image quality improving film according to claim 2, wherein, the polymerizable monomer is an acrylic monomer.

5. The image quality improving film according to claim 1, wherein, the liquid crystal polymer wall is positioned around the scattering layer, or the liquid crystal polymer wall is positioned outside two opposite lateral sides of the scattering layer.

6. The image quality improving film according to claim 1, wherein, the material of the scattering layer is a polymer of a liquid crystal, a polymerizable monomer and a photo-initiator.

7. A display panel comprising the image quality improving film according to claim 1, wherein the image quality improving film is attached to image-displaying side of a display layer in the display panel, and the scattering layer of the image quality improving film covers a pixel region of the display layer.

8. A display device, wherein, the display device comprises the display panel according to claim 7.

9. A preparation method of an image quality improving film to be attached to image-displaying side of a display layer in a display panel, wherein, the preparation method of an image quality improving film comprises the following step:
   forming a scattering layer for covering a pixel region of a display to scatter a light coming from the display layer, on a first substrate; and
   fixing a second substrate onto the scattering layer,
   wherein, before fixing the second substrate onto the scattering layer, the preparation method of an image quality improving film further comprises:
   forming a first transparent conductive layer on the first substrate, the first transparent conductive layer being positioned outside the scattering layer, and an inner lateral face of the first transparent conductive layer being attached to an outer lateral face of the scattering layer;
   forming a second transparent conductive layer on the second substrate, the second transparent conductive layer having the same pattern as that of the first transparent conductive layer, and an orthographic projection on the first substrate of the second transparent conductive layer coinciding with that of the first transparent conductive layer; and
   forming a liquid crystal polymer wall on the second transparent conductive layer, the liquid crystal polymer wall covering the second transparent conductive layer.

10. The preparation method of an image quality improving film according to claim 9, wherein, said forming a scattering layer on a first substrate comprises:
    mixing a liquid crystal, a polymerizable monomer and a photo-initiator for preparing the scattering layer in the following mass percentages:
    the liquid crystal: 70%-80% by mass, the polymerizable monomer: 19%-29.5% by mass, and the photo-initiator: 0.3%-1% by mass of the polymerizable monomer;
    applying the mixed materials for preparing the scattering layer onto the first substrate, and polymerizing and curing the materials to form the scattering layer.

11. The preparation method of an image quality improving film according to claim 10, wherein, said polymerizing and curing the materials to form the scattering layer is performed by irradiating with UV light.

12. The preparation method of an image quality improving film according to claim 9, wherein, said forming a liquid crystal polymer wall on the second transparent conductive layer comprises:
    mixing a dichroic dye, a liquid crystal, a polymerizable monomer and a photo-initiator for preparing the liquid crystal polymer wall in the following mass percentages:
    the dichroic dye: 0.5%-1% by mass, the liquid crystal: 70%-80% by mass, the polymerizable monomer: 19%-29.5% by mass, and the photo-initiator: 0.3%-1% by mass of the polymerizable monomer;
    applying the mixed materials for preparing the liquid crystal polymer wall onto the second transparent conductive layer, and polymerizing and curing the materials to form the liquid crystal polymer wall.

13. The preparation method of an image quality improving film according to claim 12, wherein, said polymerizing and curing the materials to form the liquid crystal polymer wall is performed by irradiating with UV light.

14. The preparation method of an image quality improving film according to claim 9, wherein, the first transparent conductive layer being positioned outside the scattering layer comprises:
    the first transparent conductive layer being positioned around the scattering layer, or the first transparent conductive layer is positioned outside two opposite lateral sides of the scattering layer.

* * * * *